(No Model.)

A. CALDWELL.
MODE OF ATTACHING TIPS TO FLEXIBLE TUBING FOR GAS.

No. 480,247.  Patented Aug. 9, 1892.

Witnesses:  Inventor:
E. C. First  Alfred Caldwell
E. H. Brown  By Walter B. Vincent Atty.

THE NORRIS PETERS CO., PHOTO-LITHO., WASHINGTON, D. C.

UNITED STATES PATENT OFFICE.

ALFRED CALDWELL, OF PROVIDENCE, RHODE ISLAND.

MODE OF ATTACHING TIPS TO FLEXIBLE TUBING FOR GAS.

SPECIFICATION forming part of Letters Patent No. 480,247, dated August 9, 1892.

Application filed February 24, 1892. Serial No. 422,625. (No model.)

*To all whom it may concern:*

Be it known that I, ALFRED CALDWELL, of Providence, in the State of Rhode Island, have made certain new and useful Improvements in the Mode of Attaching Tips to Flexible Tubing for Gas; and I do hereby declare that the following specification, taken in connection with the drawings making a part of the same, is a full, clear, and exact description thereof.

Figure 1:
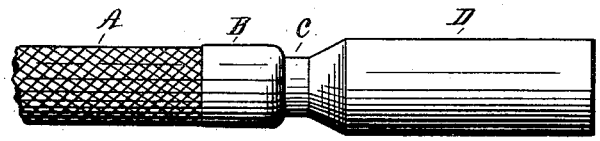
Figure 2:
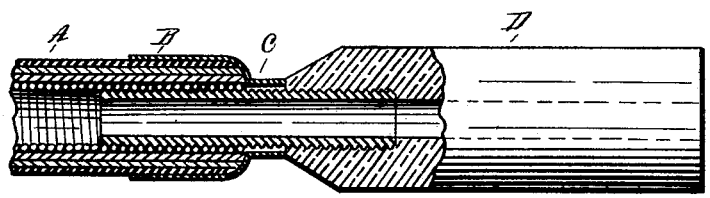
Figures 3, 4:
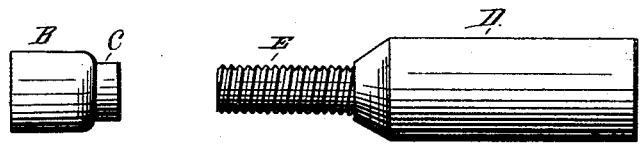
Figure 5:
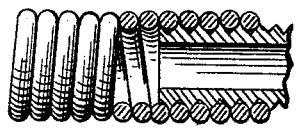

Figure 1 shows a piece of gas-tubing with the tip or socket attached. Fig. 2 is a partial section of same, enlarged, showing construction and mode of attachment. Fig. 3 shows the tip or socket with its screw-shank. Fig. 4 is the end cap. Fig. 5 is an enlarged view, partially in section, of the interior spiral wire.

My invention is more particularly designed to be used in connection with a flexible gas-tubing having an interior spiral wire supporting the same, although it may be used with good effect in tubing in the construction of which such spiral wire is not employed.

The object of my invention is to make a more complete and perfect union between the tubing and the tip or socket by which it is attached to the stove, drop-light, or source of supply and at the same time permit the parts to be more quickly and easily united.

The flexible tubing now in use is attached to the tip or socket referred to by placing the small end of the same within the end of the tubing and then winding with thread or fine wire to retain the connection of the two parts and prevent the escape of the gas. This method of attachment requires much time and care and cannot always be relied upon to make a perfectly-tight joint.

In the drawings, A, Figs. 1 and 2, is a piece of flexible tubing.

B, Figs. 1, 2, and 4, is a metallic cap, into one end of which the end of the tubing is introduced, the other end C of the same being of smaller diameter and about equal to the interior diameter of the tube.

D, Figs. 1, 2, and 3, is a tip or socket of rubber or other material suitable for connecting the tube with a drop-light, stove, or the source of gas-supply, having at one end a hollow shank E, with a screw-thread upon its exterior surface.

The flexible tube having been cut off at a suitable length for the purpose required, the cap is placed over the end and the hollow shank screwed in, as shown in Figs. 1 and 2. The interior spirally-wound wire takes the place of a female screw-thread, and the parts become so firmly united that they cannot be subsequently separated. The relative diameters of the screw-shank E, the cap B, and the tube are such that the introduction of the former will expand the tube within the cap to an extent sufficient to form a perfectly-tight joint and entirely prevent the escape of gas. The connection of the several parts as described is but the work of a moment and no especial care is required to secure a tight joint.

Heretofore in wire-lined tubing in which a cap has been used the wire has been removed from the end of the tubing for a short distance and the tip has been permanently secured therein; but in my construction I desire to utilize the wire at the end of the tubing for the reception of the screw-threaded shank of the tip, and therefore it is necessary to permanently secure the cap upon the end of the tubing before the shank is inserted, and which can be done in any ordinary manner, as by means of cement. In this manner the tube can be made in a continuous length and kept in stock, and when a portion of it is to be used it can be cut off at any point and the cap slipped over the severed end of the tube; but in cutting the tube off in this manner the wire lining extends out flush or even with the end of the remaining portion, and is therefore liable to be forced out of the end of the tube and make an unsatisfactory union or joint between the tip and the tubing. To obviate this difficulty and also to make a guide for the entering of the tip into the end of the tube, I make one end of the cap reduced to such a degree that the reduced portion will engage with the end of the wire of the tubing and prevent its being drawn out when the tip is inserted. This reduced portion, which is substantially cylindrical, will form a short guide, which will cause the end of the tip to enter the tube in a line therewith, and thus cause the threads of the tip to register with the coils of the wire and readily enter them without the danger of crossing the threads and forcing a portion of the wire out of the end of the tube.

In tubing which is not provided with an interior spiral wire in its manufacture the same connection may be made with fairly good results, although the attachment of the parts will not be as strong or as secure.

What I claim as my invention, and desire to secure by Letters Patent, is—

1. The combination, with a flexible tube having a coiled wire lining upon its interior, of a cap upon the end of the tube, the outer end of which is contracted and provided with a short cylindrical portion of a diameter slightly greater than the interior diameter of the lining of the tube, substantially as set forth.

2. The combination, with a tip or socket having a screw-threaded shank, of a tube having a coiled-wire lining upon its interior and a cap upon its exterior, the outer end of said cap being reduced and provided with a short cylindrical portion of a diameter slightly greater than the interior diameter of the lining and adapted to engage with the end of the wire lining at one end and with a shoulder upon the end of the tip at the other end, the exterior diameter of the shank of the tip being slightly greater than the interior diameter of the lining, substantially as set forth.

ALFRED CALDWELL.

Witnesses:
WALTER B. VINCENT,
E. A. BENSON.